INVENTOR.
JOHN G. LUKER
BY
Eaton, Bell, Hunt & Seltzer
ATTORNEYS

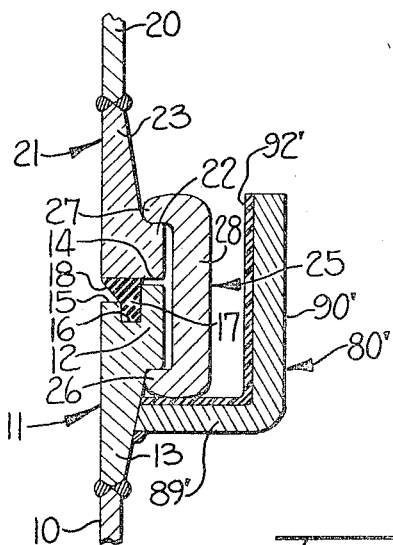
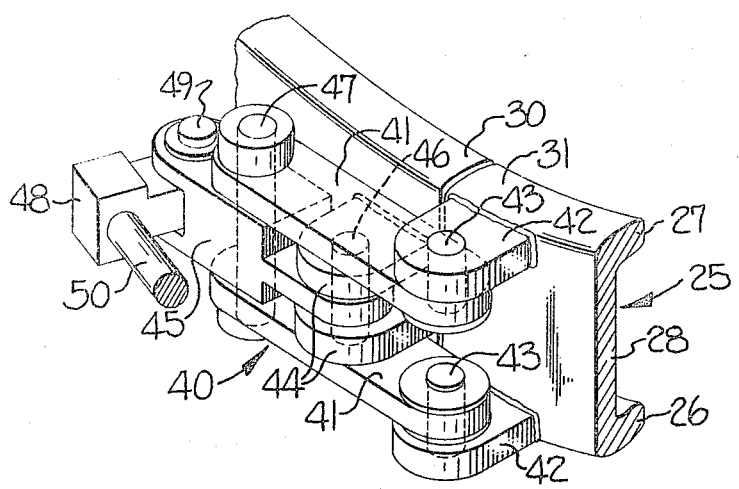

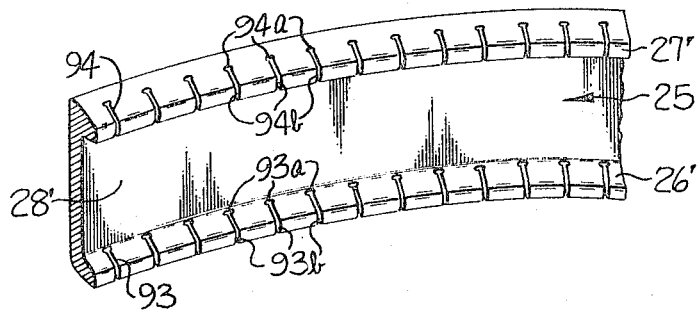
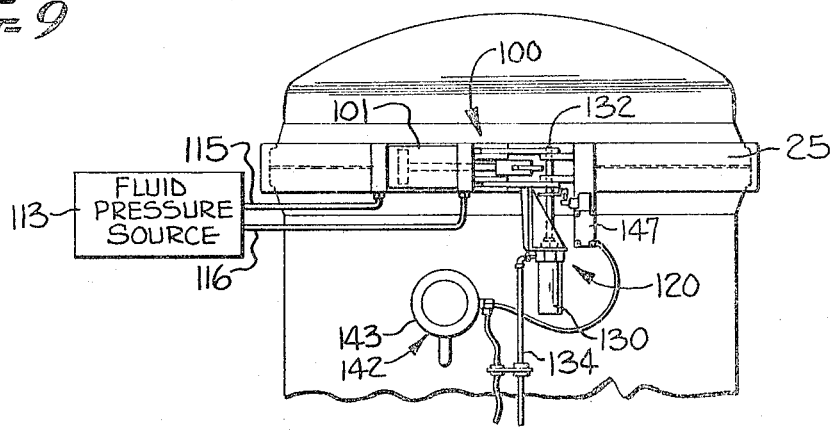
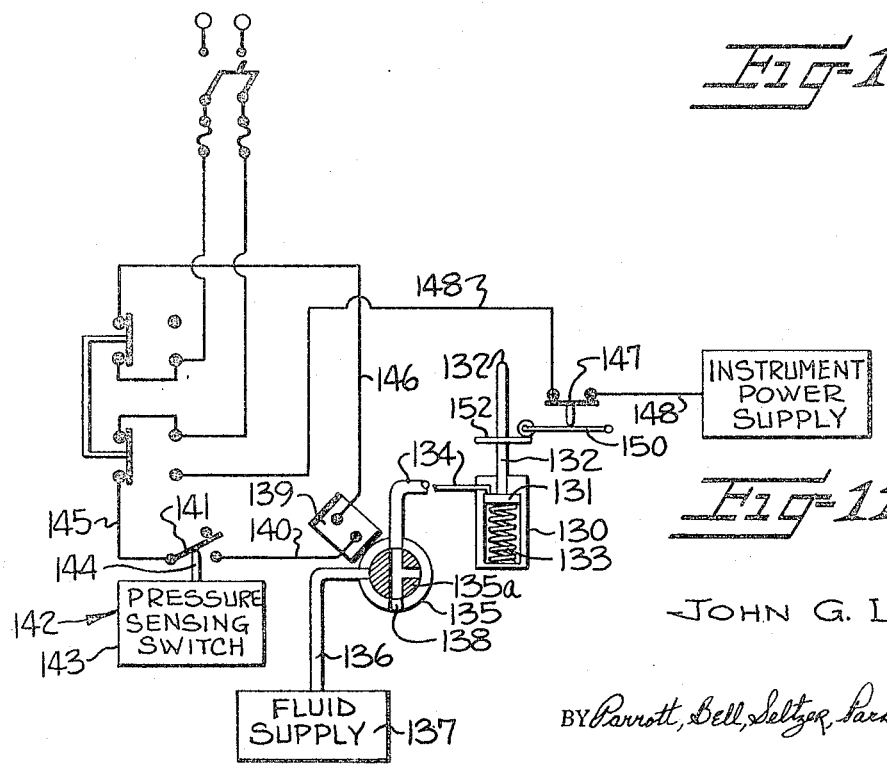

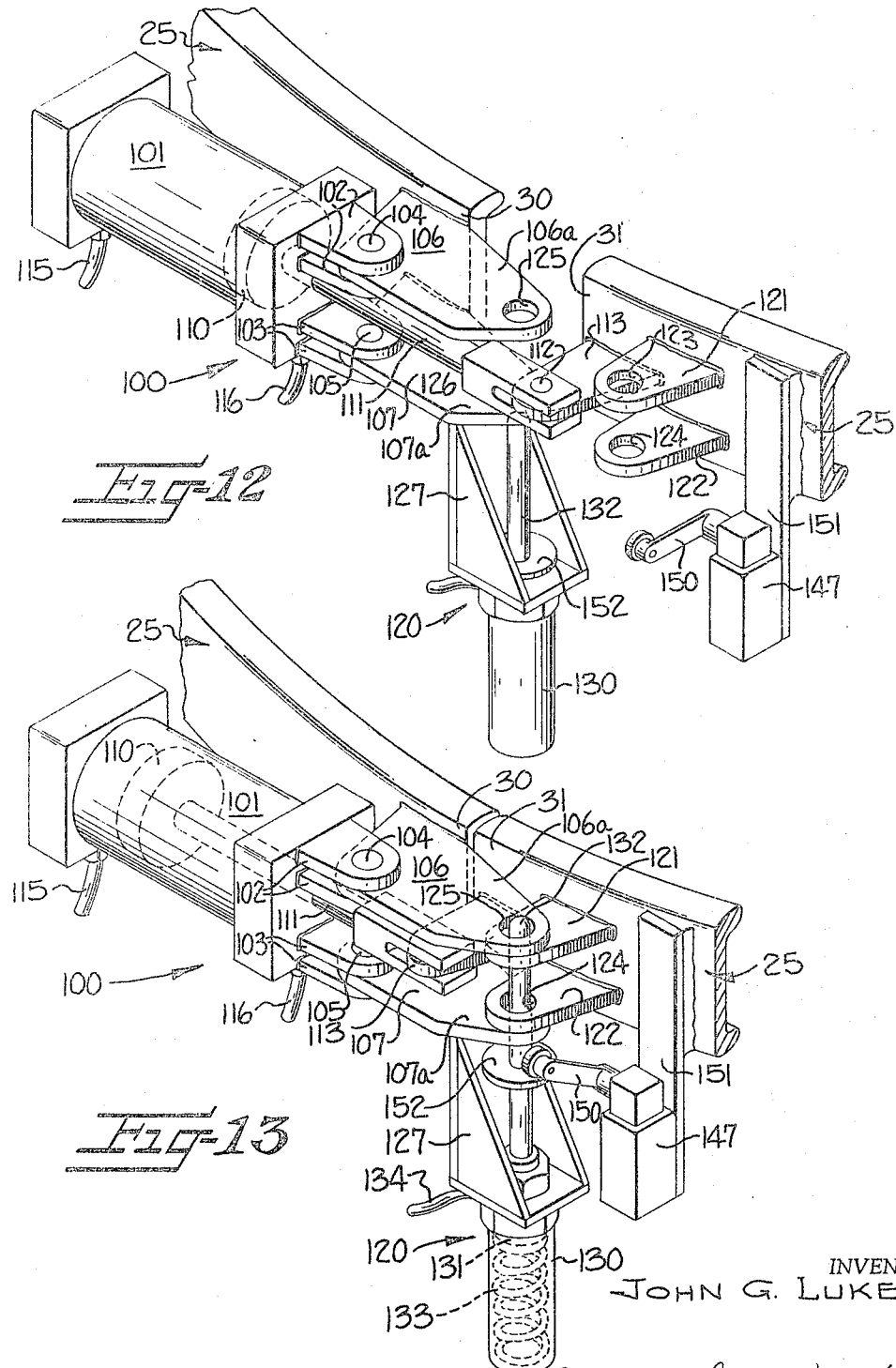

United States Patent Office 3,310,329
Patented Mar. 21, 1967

3,310,329
PRESSURE VESSEL AND CLOSURE ASSEMBLY THEREFOR
John G. Luker, Stanley, N.C., assignor to Gaston County Dyeing Machine Co., Stanley, N.C., a corporation of North Carolina
Filed Jan. 28, 1966, Ser. No. 532,039
17 Claims. (Cl. 292—256.69)

This application is a continuation-in-part of my copending application, Ser. No. 235,725, filed Nov. 6, 1962, now abandoned, and entitled, Closure Assembly.

The present invention relates to a pressure vessel or the like and an improved closure assembly therefor of simplified construction and having improved operating capabilities and providing considerably increased safety factors.

Pressure vessels and the closure assemblies of the character of the pressure vessel and closure assembly of the present invention normally contain fluids under considerable pressure and should be constructed to withstand this pressure and to operate over long periods with little or no maintenance. Such a pressure vessel and closure assembly commonly include opposed external annular flanges respectively provided on the body portion and closure member of the pressure vessel and the opposed flanges are clamped together usually by an encircling clamping ring.

Prior to the present invention, this clamping ring has been of generally two types, with the first type comprising a plurality of substantially rigid, pivotally interconnected, channel-shaped members which are moved between a clamping position holding the flanges together and an unclamping position spaced outwardly therefrom due to the pivotal movement of the members relative to each other. The second type of conventional clamping ring includes a plurality of spaced apart, rigid, channel-shaped segments connected together in a generally circular configuration by a lightweight, flexible band connected to each of the segments.

Many problems and deficiencies have been encountered with such conventional clamping rings both in the manufacture and operation thereof. In this respect, clamping rings of the first type including pivotally connected members are, of necessity, heavy massive structures which are difficult to manufacture and handle and are quite expensive. Also, such clamping rings do not provide a clamping action completely around the circumference of the opposed flanges which is highly undesirable since a good, reliable seal is not obtained and since the load eccentricities on the flanges are increased. Further, an excessively long stroke is required by the actuating means to free the pivotally connected members of this clamping ring from the flanges.

The second type of conventional clamping rings having the spaced segments interconnected by a flexible band are difficult to manufacture, but more importantly, such clamping rings are extremely difficult to operate and it has now been determined that such clamping rings are unsatisfactory for pressure vessels. In this respect, the segments are necessarily quite heavy and massive, while the connecting band must be sufficiently flexible so that the segments may move relative to each other for proper clamping of the flanges. This flexible nature of the connecting band causes considerable problems in moving the band to the expanded position and in obtaining complete release of the segments of the clamping ring from the opposed flanges since the connecting band will not transmit the expanding force evenly to all of the segments. Further, difficulty is encountered in positioning such clamping rings in a circular form in the expanded position due to the uneven expansion and the heavy weight and unwieldy nature thereof. Therefore, these clamping rings frequently bind on the opposed flanges or the support for the clamping ring and considerable difficulty is experienced in freeing the same therefrom.

It has been proposed to make the connecting band of a clamping ring of this type thicker and/or wider to provide a more rigid connection, but this reduces the desired relative movement between the segments and considerably increases the weight and handling problems incident thereto. In another attempt to reduce the problem of moving this clamping ring to the expanded position, the connecting band has been usually formed so as to be inherently biased toward the expanded position. However, this creates a safety hazard since if the actuating means which held the clamping ring in clamping position on the flanges were to fail, which sometimes happens, there is considerable danger that such an outwardly biased clamping ring could become released from the flanges and the fluid under pressure in the vessel could escape with harmful effect.

Still further, conventional clamping rings are constructed so that the web portions thereof engage the outer peripheries of the flanges and the legs thereof do not extend inwardly for the full width of the flanges. Also, the area of contact between the flanges and clamping ring is very large and the friction generated due to the sliding movement of the web portion on the peripheries of the flanges is considerable and materially interferes with the movement of the clamping ring to the expanded, unclamping position and contributes to the binding of the clamping ring on the flanges. This arrangement also necessitates that both the peripheries of the flanges and the interior surface of the web portion of the clamping ring be machined to relatively close tolerances, thereby increasing the problems and cost of manufacture. In this respect, it is most difficult to obtain and maintain a concentric relationship between the peripheries of the flanges and the web portion of the clamping ring and if variances occur in the diameter of various portions of the flanges, the clamping rings of prior closure assemblies could not properly compensate therefor.

Therefore, the load eccentricities on the flanges and clamping rings of such prior closure assemblies are very high and both must be constructed of heavier mass than would be required if the load eccentricities were less.

Pressure vessels of the instant type usually include a pressure responsive safety means for the purpose of preventing opening of the vessel while the pressure therein is above a predetermined, potentially harmful level. Heretofore, such safety means have operated exclusively in conjunction with the actuating means for the clamping rings, as for example, by locking the toggle linkage mechanisms in the position corresponding to the clamping position of the clamping rings. The major difficulty in this arrangement resides in the fact that the safety means is effective only when the actuating means remains intact. Therefore, if the actuating means were to fail, the safety means could also be rendered ineffective and the pressure vessel could open while the pressure therein is above a safe level.

It is, therefore, an object of the present invention to provide a pressure vessel and improved closure assembly therefor which obviates the aforementioned deficiencies of and difficulties and problems encountered with conventional pressure vessels and closure assemblies. This is accomplished by a novel closure assembly including a channel-shaped clamping band having a split therein defining spaced band ends and wherein the web portion of the band extends uninterruptedly throughout the clamping band between the band ends and the legs are formed integrally with the web portion. Also, this clamping band is formed so as to be inherently biased toward clamping position and, in most instances, the entire clamping band contributes toward this inherent bias. This clamping band construction also contributes to the transmission of expansion force to all portions of the clamping band. In addition, the clamping band is designed with respect to the opposed flanges so that the load eccentricities in the flanges are minimized and the construction thereof is considerably simplified and the manufacturing operations required in the formation thereof are reduced so that the band is less expensive and more effective than conventional clamping rings.

Accordingly, it is a more specific object of the present invention to provide a pressure vessel and closure assembly of the character described including a novel clamping band for clamping the opposed flanges together and wherein the band is of simplified and less expensive construction, the load eccentricities on the flanges are minimized, and the band will maintain the flanges clamped together in the event the actuating means fails.

A further more specific object of the present invention is to provide a pressure vessel and improved closure assembly of the character described including a clamping band and wherein the clamping band is positioned in circular form concentric with the flanges when in the expanded, unclamping position to insure complete release thereof from the flanges and wherein movement of the band between the clamping and unclamping positions is facilitated to insure correct positioning thereof and to prevent binding of the clamping band on the flanges and/or support therefor.

A still further object of the present invention is to provide a pressure vessel and improved closure assembly of the character described and including a pressure responsive safety means for locking the clamping band in the clamping position independently of the actuating means so that the pressure vessel may not be opened while the pressure therein is above a safe level even if the actuating means breaks or fails structurally.

Some of the objects of the invention having been stated, other objects will appear as the description proceeds, when taken in connection with the accompanying drawings, in which—

FIGURE 7 is an enlarged fragmentary sectional view similar to FIGURE 5, but showing a modified form of retainer unit for the clamping band;

FIGURE 8 is an enlarged fragmentary perspective view looking substantially in the direction of the arrow 8 in FIGURE 1 and illustrating a portion of the actuating means for varying the effective diameter of the clamping band in the closure assembly between contracted and expanded positions;

FIGURE 9 is a fragmentary perspective view of a clamping band particularly adapted for use with pressure vessels having opposed flanges of small external diameter;

FIGURE 10 is a fragmentary, partially schematic elevational view of a pressure vessel including a modified form of actuating means for the clamping band and a pressure responsive safety locking means;

FIGURE 11 is a schematic wiring and pneumatic diagram for the safety locking means illustrated in FIGURE 10; and FIGURES 12 and 13 are enlarged, fragmentary perspective views of the actuating means and safety locking means shown in FIGURE 10 and showing the same in different operating positions.

Referring more specifically to the drawings, there is illustrated a cylindrical pressure vessel or the like having a body portion 10, the upper end of which is open, and which has an annular rim 11 extending completely about this end opening. The annular rim 11 may be integrally formed with the cylindrical wall of the body portion 10, but more commonly will be a separate element suitably secured to the upper edge of the cylindrical wall of the body portion 10, as by welding.

Figure 5:
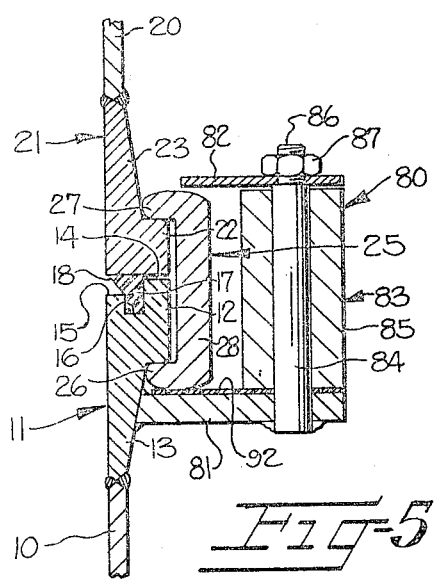
FIGURE 5 is an enlarged fragmentary sectional view taken along the line 5—5 in FIGURE 3.
Figure 6:
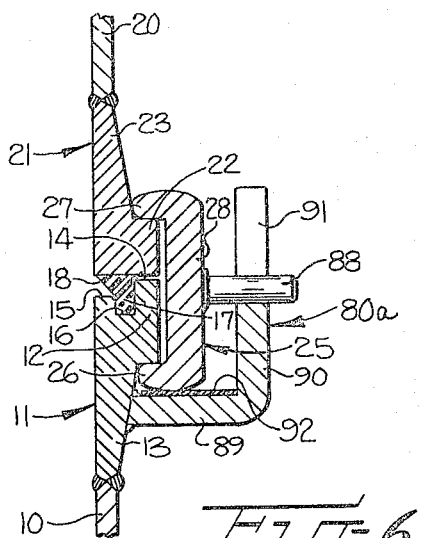
FIGURE 6 is an enlarged fragmentary sectional view taken along the line 6—6 in FIGURE 4.

As best shown in FIGURES 5 and 6, the annular rim 11 comprises an external annular flange 12 at the upper end thereof and a tapered body portion 13 extending between the external flange 12 and the upper edge of the cylindrical wall of the body portion 10. In this connection, it will be observed that the internal surface of the annular rim 11 is cylindrical and is disposed in flush relationship with the internal surface of the cylindrical wall of the body portion 10. The external flange 12 extends radially outwardly with respect to the body portion 10 and tapered body portion 13 of the annular rim 11, and the external surface of tapered body portion 13 slopes downwardly and inwardly from the flange 12. The tapered body portion 13, thus, progressively increases in thickness, measuring from its juncture when the upper edge of the cylindrical wall of the body portion 10 to its juncture with the external flange 12.

The external annular flange 12 has an upwardly disposed end face of stepped configuration, the outer section 14 of the end face extending above the inner section 15 thereof, with a groove 16 being formed in this end face between the outer and inner sections 14 and 15. An annular gasket or seal 17 is positioned in the groove 16 and is formed of suitable resilient sealing material, such as corrosion-resistive rubber or plastic. The gasket 17 is preferably of the type having a flexible, pressure-responsive sealing lip 18 disposed outwardly of the groove 16. In this connection, it will be observed that the shortened inner section 15 of the end face of the flange 12 exposes the sealing lip 18 to the interior of the pressure vessel.

The pressure vessel also includes a cover or closure member 20 for cooperation with the body portion 10 to close the end opening in the body portion 10. The closure member 20 has an annular rim 21 on the lower edge thereof similar to the annular rim 11 on the upper edge of the body portion 10 and arranged in opposed relationship thereto. While the annular rim 21 of the closure member 20 may be formed integral therewith, the same is illustrated as being a separate element suitably secured to the lower edge of the closure member 20, as by welding, for example. The annular rim 21 comprises an external annular flange 22 at the lower end thereof and a tapered body portion 23 extending between the external annular flange 22 and the lower edge of the closure member 20. The external flange 22 extends radially outwardly with respect to the closure member 20 and the tapered body portion 23 of the annular rim 21, with the external surface of the tapered body portion 23 sloping upwardly and inwardly from the flange 22. The tapered body portion 23 progressively increases in thickness, measuring from its juncture at the lower edge of the closure member 20 to its juncture with the external flange 22—thereby complementing the tapered body portion 13 of the annular rim 11.

The external annular flange 22 has a downwardly disposed planar end face cooperating with the upwardly disposed stepped end face of the external flange 12 and the gasket 17 to provide a fluid-tight sealing engagement between the closure member 20 and the body portion 10 of the pressure vessel. This sealing engagement is enhanced by the internal pressure within the pressure vessel in that the flexible lip 18 of the gasket 17 is urged into tighter sealing engagement with the end face of the external flange 22 by the pressure contained within the vessel. It will be observed that the sealing engagement between the closure member 20 and the body portion 10 is provided entirely by the gasket 17 and that the opposed external flanges 12 and 22 are slightly spaced apart.

A clamp means is provided for clamping the opposed flanges 12 and 22 together to maintain the closure member 20 in covering relation to the end opening in the body portion 10 and, for optimum operation and safety, it has now been determined that this clamp means should be in the form of a flexible clamping band 25 encircling the opposed external annular flanges 12 and 22 and being of channel-shaped cross section. Clamping band 25 includes legs 26, 27 extending inwardly from opposite edge portions thereof, and the legs 26, 27 are connected by an integral bridging portion or web 28 extending therebetween. It will be noted that the interior facing surfaces of the legs 26, 27 lie in spaced parallel planes and are respectively adapted to engage the exposed planar surfaces of the external annular flanges 12 and 22. Thus, no appreciable force urging the opposed flanges 12 and 22 toward each other will be applied by the overlying legs 26, 27 of the band 25 as it is only necessary for the legs 26, 27 to apply a force urging the flanges 12 and 22 toward each other sufficient magnitude to provide initial compression of the gasket 17.

Clamping band 25 has a split therein which forms spaced apart band ends 30, 31, and the clamping band is formed so that at least the web portion 28 thereof extends uninterruptedly throughout the clamping band between the band ends 30, 31 and except for the clamping band for small pressure vessels to be described hereinafter, the legs 26 and 27 also extend uninterruptedly throughout the clamping band between the band ends 30 and 31. Also, clamping band 25 is formed of a generally circular configuration and has an internal diameter in the relaxed state, no greater than the external diameter of the tapered body portions of annular rims 11 and 21 such that the clamping band 25 is inherently biased into engagement with the annular rims 11 and 21 with the legs 26, 27 in straddling clamping relation to the flanges 12 and 22. This assures that the clamping band 25 will normally occupy a clamping position with respect to the flanges and that the flanges will remain secured together until the clamping band is forceably moved to the expanded position out of clamping engagement thereto even if the actuating means for the clamping band fails structurally for some reason.

It is further noted that legs 26, 27 of the clamping band 25 have a radially inwardly extending length from the interior surface of the web portion 28 longer than the radially outwardly extending width of the flanges 12 and 22 such that the internal surfaces of the legs 26 and 27 bear directly against the tapered body portions 13 and 23 of rims 11 and 21 and the web portion 28 is spaced slightly outwardly from the external periphery of the flanges 12 and 22. Several distinctly desirable features are provided by this arrangement and these include the reduction of bearing surfaces between the clamping band 25 and the annular rims 11 and 21 and thereby a reduction of the frictional drag on the clamping band as it is moved between the clamping and unclamping positions, the reduction of machining operations required and the minimization of load eccentricities on the flanges and clamping band. In this latter respect, this arrangement assures that the clamping force is applied to the flanges 12 and 22 as close to the body portions 13 and 23 as is possible and thereby at a minimum distance from the central axis of the pressure vessel. Therefore, the load moments upon the flanges 12 and 22 are kept to a minimum. Further, it is substantially impossible to obtain a true circular configuration for the annular rims 11 and 21, and for the body portion 10 and closure member 20 of the pressure vessel, and, therefore, some irregularities in the circular configuration will normally present themselves. Unless some compensation is made for these irregularities, the annular rims 11 and 21 will not be in directly opposed relation and eccentricities in the load applied to the flanges 12 and 13 will present themselves.

A true circular configuration may be more easily and accurately obtained with the clamping band 25 since the clamping band has greater thickness and also since the circular configuration thereof is not disturbed by welding stresses or the like, as is the case with the annular rims 11 and 21. Accordingly, by having the interior surfaces of the legs 26 and 27 bear directly against the thinner tapered body portions 13 and 23 of the annular rims 11 and 21 rather than having the web portion 28 bear against the periphery of the flanges, the clamping band 25 forces the closure member 20 and body portion 10 of the pressure vessel to assume a truer circular configuration in the clamping position. This insures that all portions of the flanges 12 and 22 are disposed at a substantially equal distance from the central axis of the pressure vessel and, therefore, the load eccentricities on the flanges and the clamping band are minimized.

Clamping band 25 is moved from the contracted, clamping position to an expanded, unclamping position by having the space between the band ends 30 and 31 increased by a suitable actuating mechanism which in the embodiment shown in FIGURES 1–8 is in the form of a toggle linkage mechanism 40. The toggle linkage mechanism 40 also serves to lock the clamping band 25 in the contracted position.

The toggle linkage mechanism 40 comprises a pair of links 41, 41, each of which is pivotally connected at one end to a lug 42 rigidly secured to the clamping band 25 adjacent the end 31 thereof, the pair of lugs 42, 42, being respectively disposed outwardly of the links 41, 41 which are pivotally connected thereto by pins 43, 43. Lugs 44, 44, are rigidly secured to the clamping band 25 adjacent the end 30 thereof and on the opposite side of the split in the band from the end 31. The lugs 44, 44 are disposed in spaced apart relation inwardly of the links 41, 41. A reduced end portion of a toggle lever 45 is sandwiched between the lugs 44, 44 and is pivotally connected thereto by a pin 46. The toggle lever 45 includes a thickened portion extending between the other ends of the links 41, 41 and is pivotally connected thereto by a pin 47. The thickened portion of the toggle lever 45 extends beyond the ends of the links 41, 41 and terminates in a bifurcated end for receiving an actuating arm 48, the actuating arm 48 being pivotally connected within the bifurcated end of the toggle lever 45 by a pin 49.

In accordance with the present invention, the toggle mechanism 40 may be operated either manually or by remote control. In this connection, it will be observed that the end of the actuator arm 48 extending outwardly from the bifurcated toggle lever 45 is rigidly affixed to an end of a rod 50 which may serve as a handle for manual actuation or, as illustrated in the drawings, comprises a reciprocable rod which is received within one end of a cylindrical housing 51. The cylindrical housing 51 is pivotally mounted at its other end to a bracket 52, the bracket 52 being rigidly affixed to the web 28 of the clamping band 25 at a location thereon remote from the end 31. Housing 51 may be suitably connected, in a manner not shown to a source of fluid under pressure and may be remotely controlled also in a manner not shown.

The closure member 20 is hingedly connected to the body portion 10 of the pressure vessel for pivotal movement between positions opening and closing the end opening in the pressure vessel 10. In this connection, it will be observed in FIGURES 1 and 3 that the closure member 20 is pivotally suspended at its top from an overlying hinge bracket 60, the closure member having outwardly extending projections 61, 61 thereon which are suitably apertured to swivelly receive a hinge pin 62 fixedly mounted on a yoke 63 formed on one end of the hinge bracket 60. The hinge bracket 60 includes an enlarged intermediate portion comprising downwardly diverging wings 64, 64 extending radially outwardly from the perimeter of the closure member 20 and the body portion 10. The bracket wings 64, 64 have respective pairs of ears or lugs 65, 65 and 66, 66 depending therefrom in which hinge pins or axles 67, 67 are respectively fixedly carried (see FIGURE 4).

The hinge pins 67, 67 are journaled within bearing 68, 68 carried by the body portion 10 by any suitable means. In the latter connection, it will be observed in FIGURES 3 and 4 that a pair of substantially triangular fillets or struts 70, 70 are fixedly secured to the body portion 10 by any suitable means, such as welding, for example. The fillets or struts 70, 70 are connected by a plate 71 extending therebetween, the plate 71 having a straight outer edge and an arcuate inner edge which conforms with the periphery of the body portion 10 and closure member 20 (see FIGURE 1). Inverted U-shaped bearing mounts 72, 72 are affixed to opposite ends of the plate 71 with the bearings 68, 68 being respectively secured to the upper ends thereof. The hinge bracket 60 is thereby mounted for pivotal movement about the bearings 68, 68 to dispose the closure member 20 in open and closed positions with respect to the end opening in the body portion 10.

Figure 1:
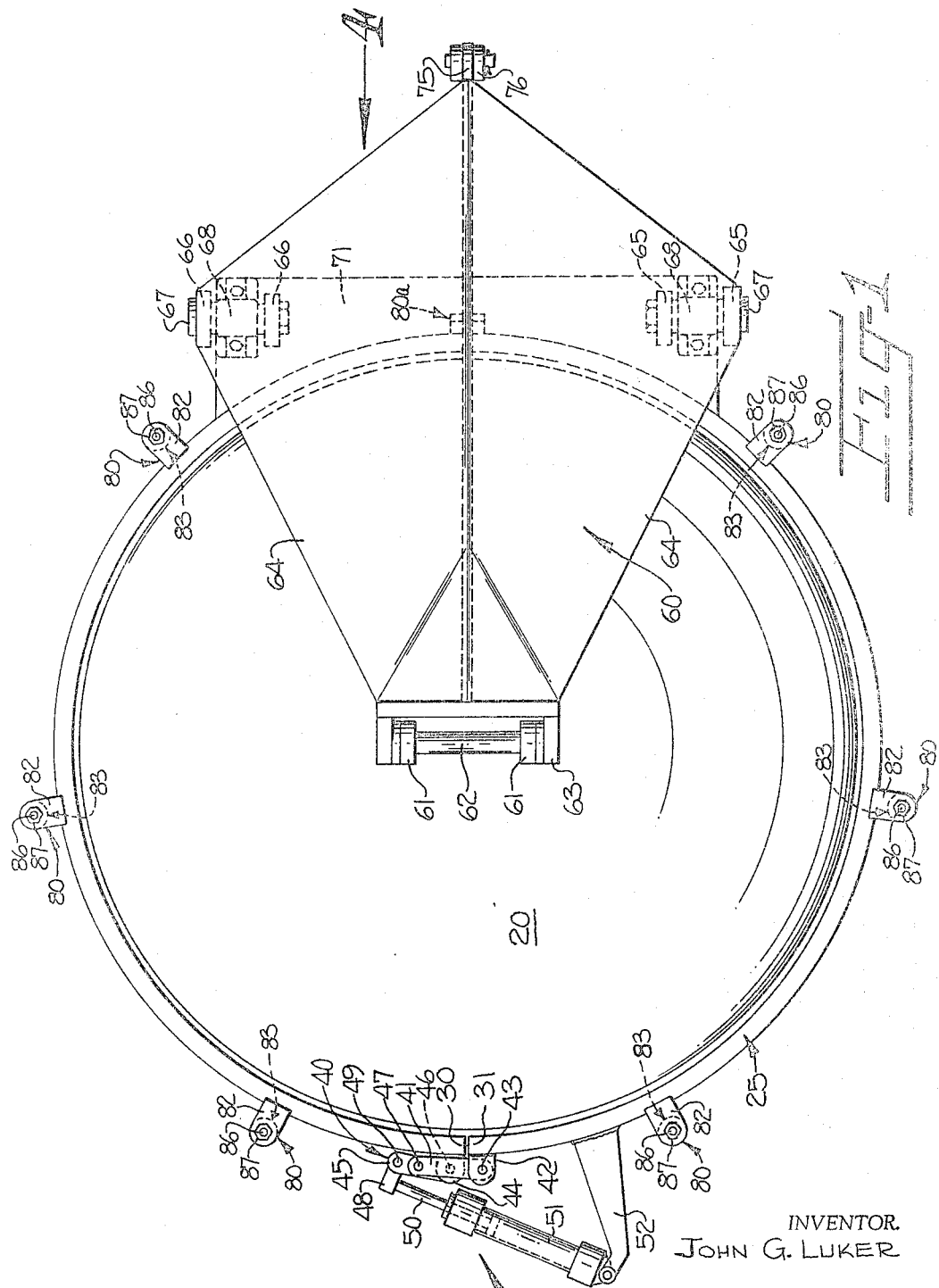
FIGURE 1 is a top plan view of a closure assembly constructed in accordance with the present invention, and showing the closure member of the closure assembly in a closed position.
Figure 2:
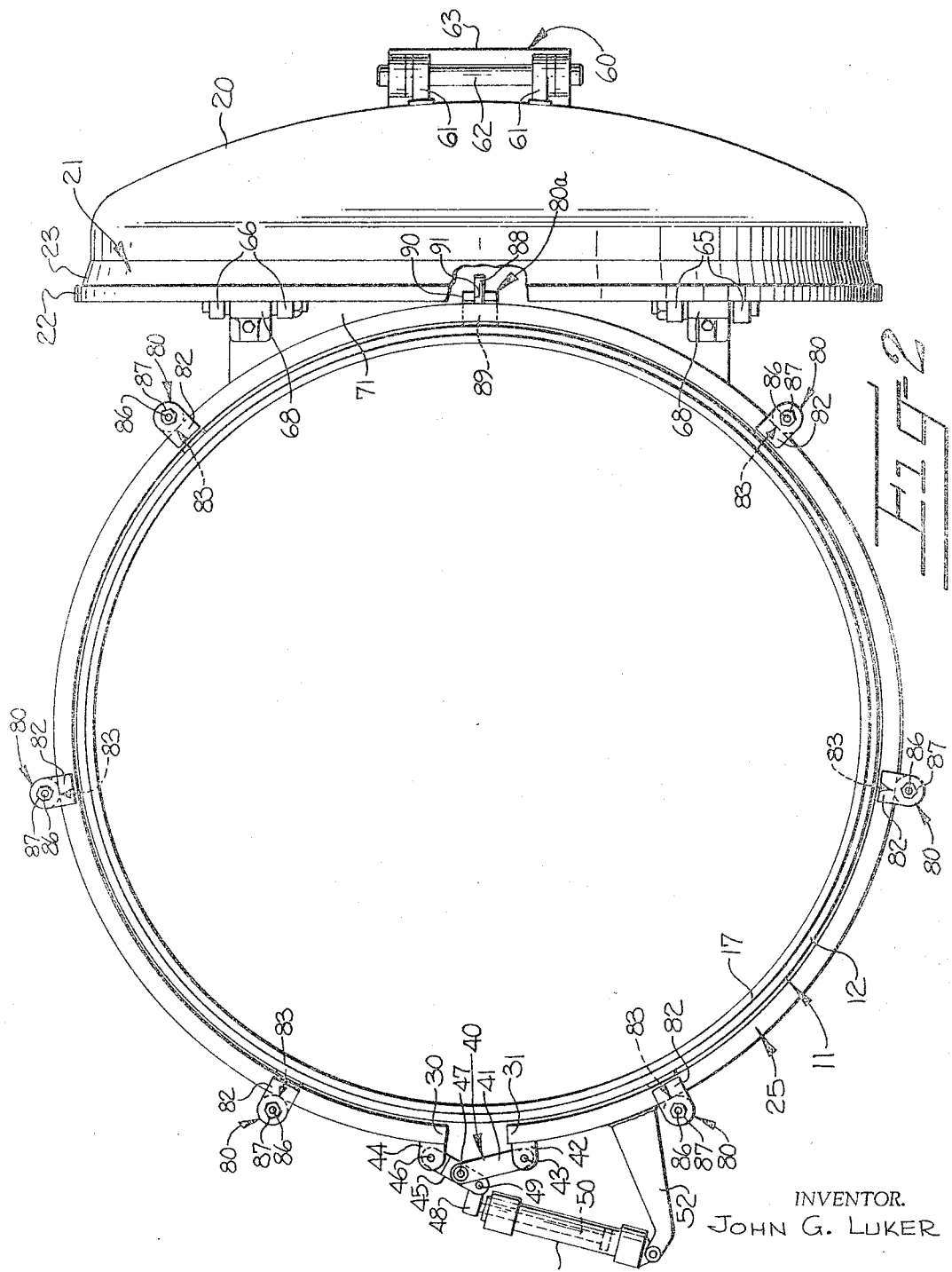
FIGURE 2 is a top plan view similar to FIGURE 1, but showing the closure assembly when the closure member thereof is disposed in an open position.
Figure 3:
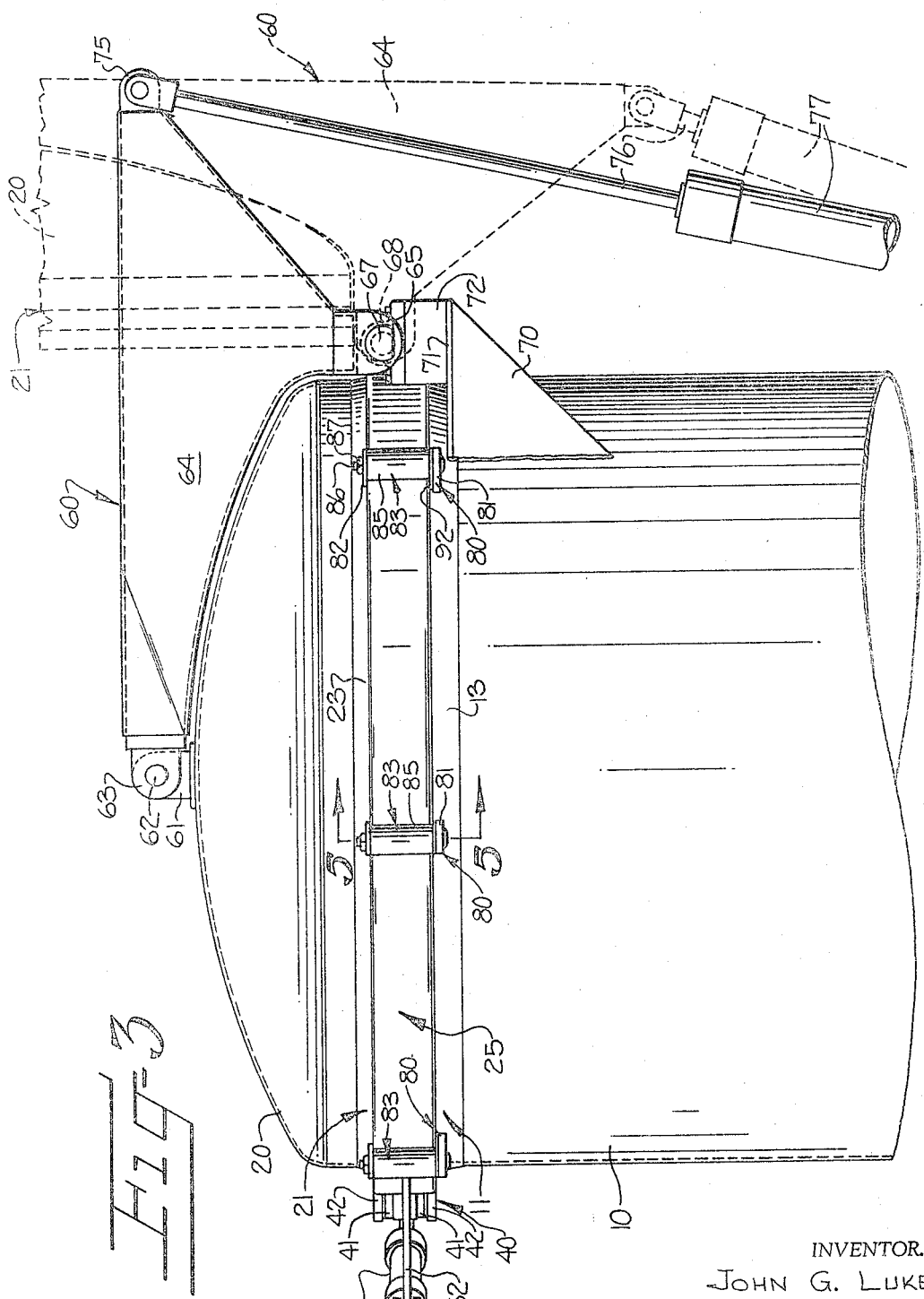
FIGURE 3 is a side elevational view of the closure assembly in accordance with FIGURE 1, but showing in fragmentary dotted lines, the open position of the closure member.
Figure 4:
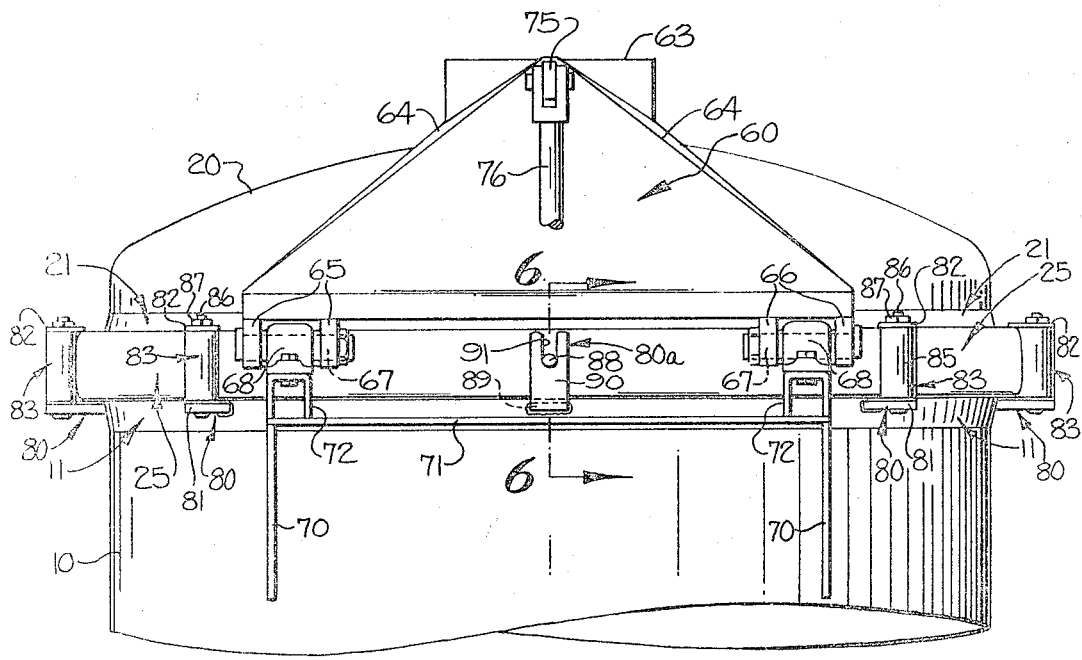
FIGURE 4 is an end elevational view of the closure assembly, looking in the direction of the arrow 4 in FIGURE 1, with parts broken away for purposes of clarity.

Referring to FIGURES 1 and 3, it will be seen that the end of hinge bracket 60 opposite from the yoke 63 terminates in an ear or lug 75 located above and radially upwardly of the pivotal connection between the hinge bracket 60 and the body portion 10. The lug 75 is pivotally secured in the bifurcated end of a rod 76 slidably received within a cylindrical housing 77. The rod 76 is reciprocable, being actuated for longitudinal movement in either direction with respect to the cylindrical housing 77 by remote control in a manner similar to that described in connection with the operation of the toggle mechanism 40 by remote control. Thus, the movement of the closure member 20 between open and closed positions may be remotely controlled by fluid pressure means, electrical means or mechanical means or may be manually accomplished in the case of small pressure vessels.

In accordance with the present invention, the pressure vessel and closure assembly therefor include means to control the outward expansion of the clamping band 25 for positioning the expanded clamping band in a substantially circular form to insure that the clamping band is completely and uniformly released from the flanges 12 and 22. Also, the movement of the band between the contracted and expanded positions is facilitated to insure that the band will not become bound on the flanges 12 and 22 or on the supports therefor.

The outward expansion of the clamping band 25 is controlled through a restraining engagement of the clamping band along its outer circumference as it moves to the expanded position, thereby providing for an equidistant spaced relationship between the clamping band 25 and the opposed external flanges 12, 22 about the entire circumference of the clamping band 25. To this end, it will be observed that a plurality of retainer units 80 (FIGURE 5) are carried by body portion 10 and are circumferentially arranged about the opposed external flanges 12, 22 and disposed radially outwardly of the clamping band 25. Preferably, there are a sufficient number of retainer units 80 to assure substantially uniform movement of the clamping band 25 to the expanded position. In this respect, there should be a retainer unit 80 disposed within sixty-degrees (60°) of each of the band ends 30, 31 of the clamping band 25 and, preferably, as is illustrated in the drawing, there is a unit 80 provided within fifteen degrees (15°) of each of the ends 30, 31.

Each of the retaining units 80 except for the retainer unit designated 80a (FIGURES 4 and 6) to be described hereinafter, comprises a channel-shaped assembly which includes spaced apart legs 81, 82, and intermediate axial arm or abutment means 83 extending between the legs 81, 82. The leg 81 is affixed at one end to the annular rim 11 on the body portion 10 at an intermediate point along the tapered body portion 13 thereof by suitable means, such as welding. The axial arm or abutment means 83 is positioned on the opposite end of the leg 81 and comprises a post or shaft 84 secured to the leg 81. Friction reducing means is carried by the axial arm or abutment means to facilitate sliding movement of the clamping band 25 relative to the abutment means as the clamping band 25 is moved toward the expanded position. Obviously, while the friction reducing means is preferably carried by the retainer units, the same could be carried by the clamping band 25 without departing from the scope of the present invention. In the embodiment illustrated in FIGURES 1–6 of the drawings, such friction reducing means comprises a cylindrical roller 85 rotatably mounted on the post 84.

The leg 82 is mounted on the threaded end 86 of the post 84 remote from the leg 81, the leg 82 being supported by the end of the roller 85 adjacent thereto, and secured in place by a nut 87 threaded onto the threaded end 86 of the post 84. The leg 82 is positioned axially outwardly with respect to the external flange 22 with the inner end edge of the leg 82 being disposed in radially outwardly disposed relation to the outer peripheries of the opposed external flanges 12, 22.

Retainer unit 80a (FIGURES 4 and 6) cooperates with a radially outwardly extending pin 88 fixedly mounted on the clamping band 25 to restrain rotation of the clamping band 25 with respect to the closure member 20, the body portion 10 and the retainer units 80. In the latter respect, it will be observed that the retainer unit 80a comprises an L-shaped member having a leg 89 fixedly secured at one end to annular rim 11 of the body portion 10 at an intermediate location on the tapered body portion 13 thereof and an abutment means in the form of an axially extending arm 90 integrally connected to the other end of the leg 89 and having an elongate slot 91 formed in the end portion thereof remote from leg 89. The radially outwardly extending pin 88 carried by the clamping band 25 is adapted to be received within the slot 91 of the retainer unit 80a, whereupon the clamping band 25 is restrained against rotation with respect to the plurality of retainer units 80, the body portion 10 and the closure member 20.

The radial width of the circumferential space provided between the opposed external flanges 12, 22 on the pressure vessel and the abutment means of the plurality of retainer units 80 and 80a is an important consideration in the present invention and should be just sufficient for the clamping band 25 to clear the flanges 12, 22 enough for the closure member to be pivoted to open position, but should be and is less than the expansive capacity of the clamping band 25. Therefore, this circumferential distance or space should be slightly greater than the thickness of the clamping band 25 at the legs 26, 27 combined with the width of the flanges 12, 22.

Each of the legs 81 of the retainer units 80 and the leg 89 of the retainer unit 80a may also have friction reducing means provided thereon which is illustrated in the drawings as an anti-friction liner 92 (FIGURES 5 and 6) made from a material having a relatively low coefficient of friction, such as nylon. The liners 92 contact and support the leg 26 of the clamping band 25 and facilitate sliding movement of the clamping band both outwardly and circumferentially with respect to the supporting means.

FIGURE 7 represents a modified form of retainer unit 80' for controlling the outward expansion of the clamping band 25 when the toggle mechanism 40 has been operated to force the band ends 30, 31 further apart, it being understood that a plurality of such retainer units 80' should be circumferentially arranged about the opposed external flanges 12, 22 and disposed radially outwardly of the clamping band 25 in place of the retainer units 80 of FIGURE 5. The retainer unit 80a of FIGURE 6 is included as one of the retainer units 80' with the retainer unit 80a restraining the clamping band 25 against rotation with respect to the plurality of retainer units 80', the body portion 10 and the closure member 20 in the manner previously described.

The retainer units 80' are similar in construction to the retainer unit 80a of FIGURE 6 except that the axially extending arm 90' of each retainer unit 80' (other than the retainer unit 80a) is not slotted, and that friction reducing means in the form of an anti-friction liner 92' extends over the radially inner surface of the arm 90' as well as the surface of the leg 89' adapted to contact and support the clamping band 25. The portions of the anti-friction liners 92' covering the radially inner surfaces of the arms 90' of the retainer units 80' serve a function similar to the rollers 85 of the retainer units 80 of FIGURE 5 in that these portions of the anti-friction liners 92' engaged by the web 28 of the expanding clamping band 25 facilitate relative sliding movement of the clamping band 25 with respect to the arm 90'. Thus, binding or cocking of the clamping band 25 with respect to the opposed external flanges 12, 22 on the body portion 10 and the closure member 20 is prevented.

Generally, the retaining units 80 of FIGURE 5 are to be preferred when the longitudinal axis of the pressure vessel 10 is horizontally disposed, since the legs 81, 82 of each retainer unit 80 cooperate to hold the clamping band 25 about the pressure vessel without actual displacement. Otherwise, the clamping band would be subject to falling from the pressure vessel if the same were not confined within the spaced parallel legs 81, 82 of the retainer units 80. The modified retaining units 80' of FIGURE 7 are suitable for use with a pressure vessel having a vertically disposed longitudinal axis.

As stated above, the legs 26, 27 of the clamping band 25 preferably extend uninterruptedly throughout the clamping band between the band ends 30, 31 except for those clamping bands to be used with small pressure vessels. For such small pressure vessels, if the legs extend uninterruptedly throughout the band, the radial thickness of the clamping band, i.e. the combined thickness of the web portion and the length of the legs measured radially, and the amount of flexure of the clamping band required to release the same from the flanges relative to the external diameter of the opposed flanges is such that movement of the band to the expanded position creates flexural stresses in the band exceeding the elastic limit and/or the fatigue limit of the material of which the clamping band is formed.

With a view to avoiding these problems with such small pressure vessels, a modified form of clamping band 25', a portion of which is shown in FIGURE 9, is preferably used. Clamping band 25' includes legs 26', 27' connected by an integrally formed web portion 28'. Like web portion 28, web portion 28' extends uninterruptedly throughout the clamping band 25', but unlike legs 26, 27, legs 26', 27' are slotted at spaced, preferably corresponding and aligned, points as indicated at 93, 94. Slots 93, 94 preferably have enlarged arcuate portions 93a, 94a at their inner ends adjacent web portion 28' and narrower, elongated portions 93b, 94b extending outwardly from enlarged portions 93a, 94a to the interior surfaces of the legs 26', 27'. This slotted construction of clamping band 25' increases the flexibility thereof and effectively reduces the radial thickness of the clamping band substantially to the radial thickness of the web portion thereof and thereby reduces the level of flexural stresses created in the clamping band during movement thereof to the expanded position to a level below the elastic and fatigue limits of the material of which the clamping band is formed. In this connection, the enlarged arcuate portions 93a, 94a of slots 93, 94 spread the flexure of the clamping band over a greater length of the band and thereby reduce the concentration of flexural stresses at the inner ends of the slots to a level below the elastic and fatigue limits of the material forming the clamping band.

In operation, assuming the closure member 20 to be disposed in closing relation to the end opening in the body portion 10 and the clamping band 25 to be disposed in the contracted clamping position with the toggle mechanism 40 locking the same in this position, the toggle mechanism 40 may be operated to pivot the toggle lever 45 outwardly about the pivot 46 by relative movement between the rod 50 and the cylindrical housing 51. When this occurs, toggle lever 45 and links 41, 41 operate to move the band ends 30, 31 further apart. Initially, the maximum expansion of the clamping band 25 will occur immediately adjacent the band ends 30, 31 until the clamping band engages one or both of the retainer units 80 disposed immediately adjacent the split in the clamping band. When the rollers 85 of these units are engaged by the clamping band, further outward radial movement of these portions of the clamping band is restrained and the expansive force being applied to the band ends by the toggle mechanism 40 is transferred circumferentially along the clamping band to the remaining portions to expand them outwardly until they engage all of the retainer units 80. It is noted that due to the particular radial spacing of the abutment means of the retainer units, the clamping band 25 does not engage the abutment means of all of the retainer units until the legs 26, 27 are completely withdrawn from clamping relation to the flanges 12, 22 about their entire circumference. On the other hand, once the legs 26, 27 have been so withdrawn, the clamping band 25 is moved into engagement with the abutment means of all of the retainer units to position the clamping band in circular form concentric with the flanges. Binding or cocking of the clamping band on the flanges is thereby substantially eliminated.

Circumferential and radial sliding movement of the clamping band 25 is facilitated by the rollers 85 and the anti-friction liners 92, thereby serving to prevent binding or cocking of the clamping band 25 with respect to the external annular flanges 12, 22 or the supporting legs 81 and abutment means 84 of the retainer units. The legs 81 and 82 of each retainer unit cooperate to define the boundaries of a circular radially extending path therebetween taken by the clamping band 25 in its movement between the contracted and expanded position.

If for some reason the clamping band 25 has a tendency to stick or bind at one or more points on the flanges 12 and 22, all of the expansive force being applied to the band ends 30, 31 will be concentrated at that point when the other portions of the band have engaged the abutment means of the retainer units such that the band will be forced to become loosened from the flanges and move outwardly to the circular expanded position. The placement of the two retainer units within sixty degrees (60°) on opposite sides of the split in the band insures that the expansive movement applied to the band ends will not only expand the band outwardly with respect to the sides of the pressure vessel, but will also move the clamping band rearwardly to free the rear portion of the clamping band from the flanges.

In closing an end opening in a pressure vessel containing fluid under considerable pressure, pressure stresses are set up in the walls of the body portion and closure member thereof. These pressure stresses frequently cause early failure of the sealing ring or gasket providing a sealed joint between the pressure vessel and its closure member. In this connection the present invention provides a construction directing these pressure stresses away from the sealing ring which seals the joint between the body portion and closure member. To this end, as hereinbefore described, annular rims 11 and 21 include the tapered body portions 13 and 23 respectively. These tapered body portions 13 and 23 direct the pressure stresses in the walls of the pressure vessel 10 and the closure member 20 outwardly of the gasket into the respective regions of the opposed external annular flanges 12 and 22 disposed radially outwardly of the gasket 17. In this way, the bending stresses frequently imparted to a sealing ring in a closure assembly of this general character leading to early failure of the sealing ring are alleviated by my construction. The gasket 17, for all practical purposes, is subjected only to pressure contained within the closed pressure vessel which impinges on its flexible lip 18 to enhance the sealing engagement of the gasket 17 with the end face of the external annular flange 22 on the closure member 20.

To achieve this desired effect of directing pressure stresses set up in the walls of the pressure vessel away from the gasket 17 to the regions of the opposed external annular flanges 12 and 22 disposed radially outwardly of the gasket 17, I have determined that a satisfactory ratio as to the degree of slope on the external surfaces of the tapered body portions 13 and 23 of the annular rims 11 and 21 is 1 to 4.

Referring now to FIGURE 10, there is disclosed a modified form of actuating means for the clamping band of the present invention which is preferred particularly for repeated operation of the clamping band and more particularly for automatically operated, relatively unattended pressure vessels. This actuating means is generally indicated at 100 and includes a fluid operated cylinder 101 which has two pairs of lugs 102, 103 carried by one end thereof and which are pivotally connected by pins 104, 105 to lugs 106, 107 which are fixedly mounted on end portion 30 of the clamping band 25, as by welding. Thus, the cylinder 101 is connected directly to end portion 30 of the clamping band 25.

A piston 110 is carried in the cylinder 101 for reciprocatory movement and has a piston rod 111 connected thereto. Piston rod 111 extends outwardly through one end of the cylinder 101 and terminates in a bifurcated end portion which is pivotally connected by a pin 112 to a lug 113 fixedly mounted on the other end 31 of the clamping band 25, as by welding. Thus, the other operating instrumentality of actuating means 100 is connected directly to the other end portion 31 of the clamping band.

The cylinder 101 is connected on opposite sides of the piston 110 therein to a fluid pressure source 114 by means of respective pipes 115 and 116 whereby fluid under pressure may be admitted to the cylinder 101 to either extend the piston rod 111 with respect to the cylinder 101 to spread apart the ends 30 and 31 of the clamping band 25 to move the clamping band to the expanded position or to withdraw the piston rod 111 therewithin to permit the clamping band ends to come closer together and to hold the band in the contracted position. It is noted that the force applied to the band ends 30, 31 is a substantially straight line force and is applied to the lugs 106, 107 and 113, substantially tangentially to the clamping band 25 at the split therein. Therefore, the force applied to the band ends 30, 31 is utilized more efficiently than was the case with the toggle mechanism 40. Also, with this straight-line, substantially tangential actuating force, a much shorter stroke is required for the actuating means than with the toggle mechanism 40 thereby permitting a much more compact arrangement requiring less space. As stated earlier, there are substantially less moving parts involved and less wear on and maintenance required for the actuating means 100 than with a toggle mechanism 40.

There is also illustrated in FIGURES 10-13 a safety locking system for the clamping band 25 for holding the same in the clamping position and this system is responsive to pressure within the pressure vessel so that the same may not be inactivated whenever the pressure in the pressure vessel is above a safe level. This safety means is generally indicated at 120 and includes a pair of lugs 121, 122 fixedly secured to the end portion 31 of clamping band 25 and extending radially outwardly therefrom and having vertically aligned holes 123, 124 in the outer portions thereof. The holes 123 and 124 are adapted to be aligned with vertically aligned holes 125, 126 in extensions 106a, 107a of lugs 106, 107 fixedly mounted on the other end portion 30 of the clamping band 25 and extending radially outwardly and circumferentially of the end 30 toward the end 31.

A bracket 127 is fixedly mounted on the lug extension 107a and extends downwardly therefrom. A cylinder 130 is mounted on bracket 127 and has a piston 131 disposed therein. Piston 131 has a piston rod 132 connected thereto which extends outwardly through the upper end portion of the cylinder 130 a distance sufficient such that the free end portion thereof extends above the lug 106. A suitable compression spring 133 is disposed between the piston 131 and the lower end portion of the cylinder 130 and operates to bias the piston toward the upper end of the cylinder and the piston rod toward the extended position. Therefore, the piston rod 132 normally penetrates through the aligned openings 123, 124 and 125, 126 in the lugs 121, 122 and 106, 107 to lock the lugs together and thereby lock the band ends 30, 31 of the clamping band 25 together.

The upper end portion of the cylinder 130 above the piston 131 has a pipe 134 connected thereto and the other end of pipe 134 is connected to a valve 135. The other side of valve 135 is connected by a pipe 136 to a source of compressed fluid 137. Valve 135 is a three-way valve and includes a rotatable core 135a with two intersecting passages therein. The core 135a is rotated between one position wherein the passages therein communicate with pipes 134, 136 for delivering fluid under pressure to the cylinder 130 to move the piston downwardly against the action of the spring 133 to retract the piston rod 132 out of the openings, and a second position, normally occupied by the core, wherein the passages therein communicate with pipe 134 and a vent opening 138 in the valve housing to vent the cylinder 130 and permit the spring 133 to extend the piston rod and hold the same in extended position.

The core 135a of the valve 135 is preferably operated by a solenoid 139. This solenoid 139 is connected by a line 140 to one side of a switch 141 of a pressure responsive device 142, which also includes a pressure sensing means 143. Pressure sensing means 143 includes a pressure-responsive diaphragm (not shown) which communicates with the interior of the body portion 10 of the pressure vessel and this pressure-responsive diaphragm is connected to the switch element 141 by a plunger 144.

The other side of the switch 141 is connected by a line 145 to the main circuit of the control system for the pressure vessel. The other side of solenoid 139 is connected by a line 146 to this same circuit to complete the circuit to the solenoid 139. As illustrated in FIGURE 10, when pressure within the pressure vessel is above a predetermined safe level, the pressure sensing means 143 operates to move the switch 141 to the open position thereby breaking the circuit to the solenoid 139. Valve 135 is thereby permitted to occupy its normal position wherein the fluid supply is disconnected from the cylinder 130 and the cylinder 130 is vented to the atmosphere. Piston rod 132 is in the extended position due to the biasing action of spring 133 on piston 131 and locks the band ends 30, 31 together. When the pressure within the vessel is reduced to the predetermined safe level, the switch 141 is moved to the closed position thereby completing the circuit to the solenoid 139 which moves the valve core 135a to a position to connect the fluid supply with the cylinder 130 and retract the piston 131 and piston rod 132 to unlock the band ends 30, 31.

An additional safety factor is provided and comprises a switch 147 connected in the main power line 148 to the instrument panel controlling the operation of the pressure vessel and controlling the operation of the solenoid 139. Switch 147 has a pivotally mounted actuating lever 150 and this actuating lever and the switch are carried by a bracket 151 fixedly mounted on the band end portion 31 and extending downwardly therefrom. The lever 150 extends outwardly from the bracket 151 into the path of movement of a collar 152 carried by the piston rod 132.

Therefore, when the clamping band 25 moves to the contracted position bringing the openings 123, 124, 125 and 126 into alignment and the piston rod 132 is extended into and through these openings to lock the end portions 30 and 31 together, the collar 152 engages the lever 150 pivoting the same upwardly and closing the switch 147 and thereby completing a circuit to the control panel of the pressure vessel. If for some reason the clamping band 25 does not move to the completely contracted and proper clamping position and thereby does not move the openings in the lugs 106, 107 and 121, 122 into alignment and the rod 132 is permitted to be extended, but does not penetrate through the openings in both sets of lugs, but just through the openings in the lugs 106, 107 such that the lugs are not locked together, the lever 150 will not be pivoted by the collar 152 since the lever will not be in the path of movement thereof, and the entire operation of the pressure vessel will be prevented until the clamping band has been moved to the fully clamped position and locked together by the locking means 120.

It is therefore believed apparent that a novel pressure vessel and closure assembly have been disclosed providing improved safety and operation with less maintenance requirements and wherein load eccentricities on the closure assembly are minimized, complete release of the clamping band of the closure assembly is insured, movement of the clamping band between its respective positions is facilitated, and the clamping band is locked in clamping position independently of the actuating means therefor whenever the pressure in the pressure vessel is above a safe level.

In the drawings and specification there have been set forth preferred embodiments of the invention and, although specific terms are employed, they are used in a generic and descriptive sense only and not for purposes of limitation the scope of the invention being defined in the claims.

I claim:

1. In a closure assembly for an opening in a cylindrical member, such as a pressure vessel or the like, wherein the cylindrical member has an external annular flange of predetermined width bounding the opening therein;

(a) a removable closure member for closing the opening in said cylindrical member and having an external annular flange of corresponding predetermined width opposed to the external annular flange on the cylindrical member, (b) a substantially circular resilient clamping band encircling the opposed external flanges and having a split therein forming spaced band ends, said clamping band having a web portion extending uninterruptedly throughout the clamping band between said band ends and having legs formed integrally with and extending radially inwardly from opposite edge portions of said web portion, the resiliency of said clamping band causing said band to normally occupy and be inherently biased toward a contracted position wherein said legs straddle and are in clamping engagement with the external flanges for clamping the flanges together, said clamping band being adapted to be moved from said contracted position to an expanded circular position wherein said legs are out of straddling relation to the flanges to release said clamping band from said flanges and being of such stiffness as to avoid buckling thereof from circumferential forces along said band when the band is moved from said contracted to expanded position, (c) retaining means mounted on said cylindrical member and circularly arranged about said external flanges, said retaining means being disposed radially outwardly of said clamping band when said clamping band is in said contracted position and uniformly spaced therefrom a distance slightly greater than the radially inwardly extending length of said legs to permit said legs to move out of straddling relation to the opposed flanges, but a distance substantially less than the expansive capacity of said clamping band, said retaining means including friction reducing means engageable with said clamping band as the same is moved toward the expanded position for facilitating movement of the clamping band into the expanded position, said retaining means comprising a plurality of retainer units positioned in circumferentially spaced relationship about said opposed external flanges, each of said retainer units comprising (1) a leg fixedly secured at its inner end to the cylindrical member and extending radially outwardly therefrom and supporting said clamping band thereon, and (2) an arm carried by said radially extending leg and extending perpendicularly thereto and transversely of said clamping band, and (d) actuating means connected to said band ends of said clamping band and operable to increase the space between said band ends to move the clamping band from said normal contracted position to said expanded position, said actuating means with the aid of said stiffness of said clamping band being operable to move said clamping band into engagement with said retaining means and cooperating with said retaining means to position said clamping band in said expanded circular position to obtain complete release of said clamping band from the opposed flanges of said cylindrical member and said closure member.

2. A closure assembly according to claim 1 including (e) separate means structurally independent of said actuating means for independently releasably locking said band ends together when said clamping band is in said contracted position and insuring that the clamping band remains in the contracted, clamping position while the cylindrical member is under pressure irrespective of failure of the actuating means.

3. In a closure assembly according to claim 1 wherein said friction reducing means comprises a roller carried by said arm of each of said retainer units and being mounted for rotation about an axis extending transversely of said clamping band.

4. In a closure assembly according to claim 1 wherein said friction reducing means comprises an anti-friction liner of friction reducing material carried by the inner surface of said arm of each of said retainer units.

5. In a closure assembly according to claim 1 wherein said friction reducing means includes anti-friction liners formed of friction reducing material and carried by the surface of said radially extending legs of said retainer units on which said clamping band is supported to facilitate radial and circumferential sliding movement of the clamping band.

6. In a closure assembly according to claim 1 wherein each of said retainer units further includes a second radially extending leg carried by the upper portion of said arm and overlying said clamping band to retain said clamping band between said radial legs and on said cylindrical member.

7. In a closure assembly according to claim 1 wherein said legs of said clamping band have spaced apart, elongated slots therethrough radially extending from the inner ends of said legs substantially throughout the length thereof to effectively reduce the radial thickness of the clamping band to thereby reduce the level of flexural stresses created in the clamping band during use.

8. In a closure assembly for an end opening in a cylindrical member, such as a pressure vessel, a conduit, or the like, wherein the cylindrical member has an external annular flange bounding the end opening therein;
   (a) a removable closure member for closing the end opening and having an external annular flange opposed to the external annular flange on the cylindrical member,
   (b) a substantially circular, flexible clamp means encircling the opposed external flanges and having legs extending radially inwardly from opposite edge portions thereof, said clamp means having at least one split therein forming spaced clamp ends,
   (c) means connected to the clamp ends and operable to vary the space therebetween for varying the effective diameter of said clamp means between a contracted position in which said legs at opposite edge portions of said clamp means are respectively disposed in overlying engagement with the external flange corresponding thereto for clamping the opposed external flanges together to hold said closure member in a position closing the end opening and an expanded position in which the effective smallest diameter of said clamp means exceeds the outer diameters of the opposed external flanges,
   (d) retaining means for said clamp means comprising a plurality of retainer units positioned in circumferentially spaced relationship about said opposed external flanges, each of said retainer units comprising
      (1) a pair of spaced parallel radial legs disposed axially outwardly of said legs of said clamp means and one of said legs being fixedly secured to the cylindrical member,
      (2) a shaft extending between the outer end portions of said legs of said retainer unit and connecting said legs of said retainer unit, and
      (3) a roller mounted on said shaft for rotation thereabout intermediate the ends thereof and between said legs of said retainer unit,
   (e) said rollers of said retainer units being disposed radially outwardly of said clamp means for engagement therewith at spaced points along its periphery to limit radially outward movement thereof and to control the movement of said clamp means to expanded position, and said retainer units supporting said clamp means in substantially equidistant radially outwardly spaced relation from the opposed external flanges when said clamp means is in expanded position to release said closure means from clamped relation to the cylindrical member for removal thereof from the end opening.

9. In a closure assembly for an opening in a cylindrical member, such as a pressure vessel or the like, wherein the cylindrical member has an external annular flange bounding the opening therein;
   (a) a removable closure member for closing the opening in said cylindrical member and having an external annular flange opposed to the external annular flange on the cylindrical member,
   (b) a substantially circular resilient clamping band encircling the opposed external flanges and having a split therein forming spaced band ends, said clamping band having a web portion extending uninterruptedly throughout the clamping band between said band ends and having legs formed integrally with and extending radially inwardly from opposite edge portions of said web portion, the resiliency of said clamping band causing said band to normally occupy and be inherently biased toward a contracted circular position wherein said legs straddle and are in clamping engagement with the opposed external flanges for clamping the flanges together, said clamping band being adapted to be moved from said contracted position to an expanded circular position wherein said legs are out of straddling relation to the flanges to release said clamping band from said flanges and being of such stiffness to avoid buckling thereof from circumferential forces along said band when the band is moved from said contracted to expanded position,
   (c) retaining means mounted on said cylindrical member and circularly arranged about said external flanges, said retaining means being disposed radially outwardly of said clamping band when said clamping band is in said contracted position and uniformly spaced therefrom a distance slightly greater than the radially inwardly extending length of said legs sufficient to permit said legs to move out of straddling relation to the opposed flanges but substantially less than the expansive capacity of said clamping band, said retaining means comprising a plurality of separate retainer units positioned in circumferentially spaced relationship about said opposed external flanges, each of said retainer units including friction-reducing means engageable with said clamping band as the same is moved toward the expanded position for facilitating movement of the clamping band into such expanded position,
   (d) actuating means including a prime mover and a reciprocable member operated thereby, said prime mover being singularly pivotally connected to one of said band ends of said clamping band and said reciprocable member being singularly pivotally connected to the other band end whereby said actuating means is operable to apply a force to the band ends along a substantially straight line, substantially tangential to said clamping band at the split therein for moving the clamping band between the contracted position and the expanded position, said actuating means moving said clamping band into engagement with said retaining means and cooperating with said retaining means to position said clamping band in said expanded circular position to obtain complete release of said clamping band from the opposed external flanges of said cylindrical member and said closure member.

10. A closure assembly according to claim 9 wherein said prime mover comprises a fluid operated cylinder-piston mechanism, first singular pivotal connecting means connecting said cylinder directly to one of said band ends, said reciprocable member comprising a piston rod connected at one end to said piston and extending outwardly therefrom through one end of said cylinder, and second singular pivotal connecting means connecting the other end of said piston rod to the other band end.

11. A closure assembly according to claim 10 wherein said first singular pivotal connecting means comprises first lug means fixedly mounted on said one band end and a singular pivotal connection pivotally connecting said first lug means directly to said cylinder, and wherein said second pivotal connecting means comprises second lug means fixedly mounted on said other band end and a singular pivotal connection pivotally connecting said second lug means directly to said piston rod.

12. A closure assembly according to claim 9 including
(e) separate means structurally independent of said actuating means for independently releasably locking said band ends together when said clamping band is in said contracted position and insuring that the clamping band remains in the contracted, clamping position while the cylindrical member is under pressure irrespective of failure of the actuating means.

13. A closure assembly according to claim 12 wherein said locking means is constantly biased toward the locked position and must be forcibly withdrawn to unlock the band ends, and wherein said closure assembly includes
(f) means carried by said cylindrical member and responsive to pressure therein and connected to said locking means for preventing unlocking thereof when the pressure in the cylindrical member is above a predetermined, safe level.

14. A closure assembly according to claim 12 wherein said locking means includes
  (1) lug means carried by each of said band ends and movable into lapping relation with each other when said clamping band moves to said contracted position,
  (2) reciprocable means movable into operative engagement with said lug means when the same are in lapping relation to releasably lock the lug means together and being biased toward this operative engagement, and
  (3) means connected to said reciprocable means for retracting the same to move said reciprocable means out of engagement with said lug means to unlock the same.

15. A closure assembly according to claim 14 wherein said lug means have openings therein which are in alignment when said lug means are in lapping relation, and wherein said reciprocable means comprises a rod movable into said aligned openings in said lug means to lock said lug means together.

16. A closure assembly according to claim 15 wherein said means for retracting said reciprocable means is fluid operated and includes valve means for controlling the operation of said retracting means, and wherein said closure assembly further includes
(f) means carried by said cylindrical member and responsive to pressure therein and connected to said valve means for preventing operation of said valve means to supply fluid to said retracting means when the pressure in said cylindrical member is above a predetermined, safe level.

17. A closure assembly according to claim 12 including
(g) means operatively associated with said locking means for actuation thereby when said locking means is in the locked position and interposed between said cylindrical member and its source of pressure for preventing the supplying of pressure to said cylindrical member until said locking means is in the locked position.

References Cited by the Examiner

UNITED STATES PATENTS

| | | | |
|---|---|---|---|
| 643,908 | 2/1900 | Meyer | 215—96 |
| 1,042,209 | 10/1912 | Eichhorn | 215—96 |
| 1,603,903 | 10/1926 | Church | 220—46 |
| 1,871,834 | 8/1932 | Astrom | 292—256.67 |
| 2,721,094 | 10/1955 | Webster | 292—256.69 |
| 2,982,437 | 5/1961 | Wheatley | 220—46 |
| 3,144,165 | 8/1964 | Pegon et al. | 220—55.3 |
| 3,157,122 | 11/1964 | Laurent et al. | 229—256.69 |

FOREIGN PATENTS

| | | |
|---|---|---|
| 851,395 | 10/1960 | Great Britain. |
| 597,582 | 8/1959 | Italy. |
| 72,072 | 11/1959 | Sweden. |
| 74,742 | 4/1917 | Switzerland. |

THERON E. CONDON, *Primary Examiner.*

JAMES R. GARRETT, *Examiner.*